(12) United States Patent
Nakamura et al.

(10) Patent No.: US 11,502,627 B2
(45) Date of Patent: Nov. 15, 2022

(54) PIEZOELECTRIC DRIVE DEVICE, PIEZOELECTRIC MOTOR, AND ROBOT

(71) Applicant: SEIKO EPSON CORPORATION, Tokyo (JP)

(72) Inventors: Yusaku Nakamura, Chino (JP); Daisuke Nakanishi, Azumino (JP); Yudai Okamae, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 3 days.

(21) Appl. No.: 17/361,353

(22) Filed: Jun. 29, 2021

(65) Prior Publication Data

US 2021/0408944 A1 Dec. 30, 2021

(30) Foreign Application Priority Data

Jun. 30, 2020 (JP) .............................. JP2020-112530

(51) Int. Cl.
*H02N 2/12* (2006.01)
*H02N 2/10* (2006.01)

(52) U.S. Cl.
CPC ............... *H02N 2/12* (2013.01); *H02N 2/103* (2013.01)

(58) Field of Classification Search
CPC .......... H02N 2/12; H02N 2/103; H02N 2/006; H02N 2/0075; H02N 2/004; H02N 2/003; H02N 2/10; B25J 9/12; B25J 9/126
See application file for complete search history.

(56) References Cited

U.S. PATENT DOCUMENTS

2012/0316674 A1* 12/2012 Urano ................... H02N 2/103
                                                        318/116
2013/0140954 A1* 6/2013 Kamijo ............... H02N 2/0015
                                                        310/330
2020/0036302 A1 1/2020 Saito

FOREIGN PATENT DOCUMENTS

JP       2015186329 A   10/2015
JP       2020018079 A    1/2020

* cited by examiner

*Primary Examiner* — Emily P Pham
(74) *Attorney, Agent, or Firm* — Gang Yu

(57) ABSTRACT

A piezoelectric drive device includes a vibrator having a vibrating portion including a piezoelectric element, and a convex portion placed in the vibrating portion, an urging member including a base, a holding portion holding the vibrator, and a spring portion coupled to the base at one end and coupled to the holding portion at another end and urging the convex portion toward a driven unit, wherein $d1>d2$ in a natural state in which the vibrator is not urged by the urging member, where a separation distance between the one end and the convex portion along directions of the longitudinal direction is d1 and a separation distance between the other end and the convex portion is d2, and $|d1-d2|$ in an urging state in which the vibrator is urged toward the driven unit by the urging member is smaller than $|d1-d2|$ in the natural state.

10 Claims, 17 Drawing Sheets

FIG. 5
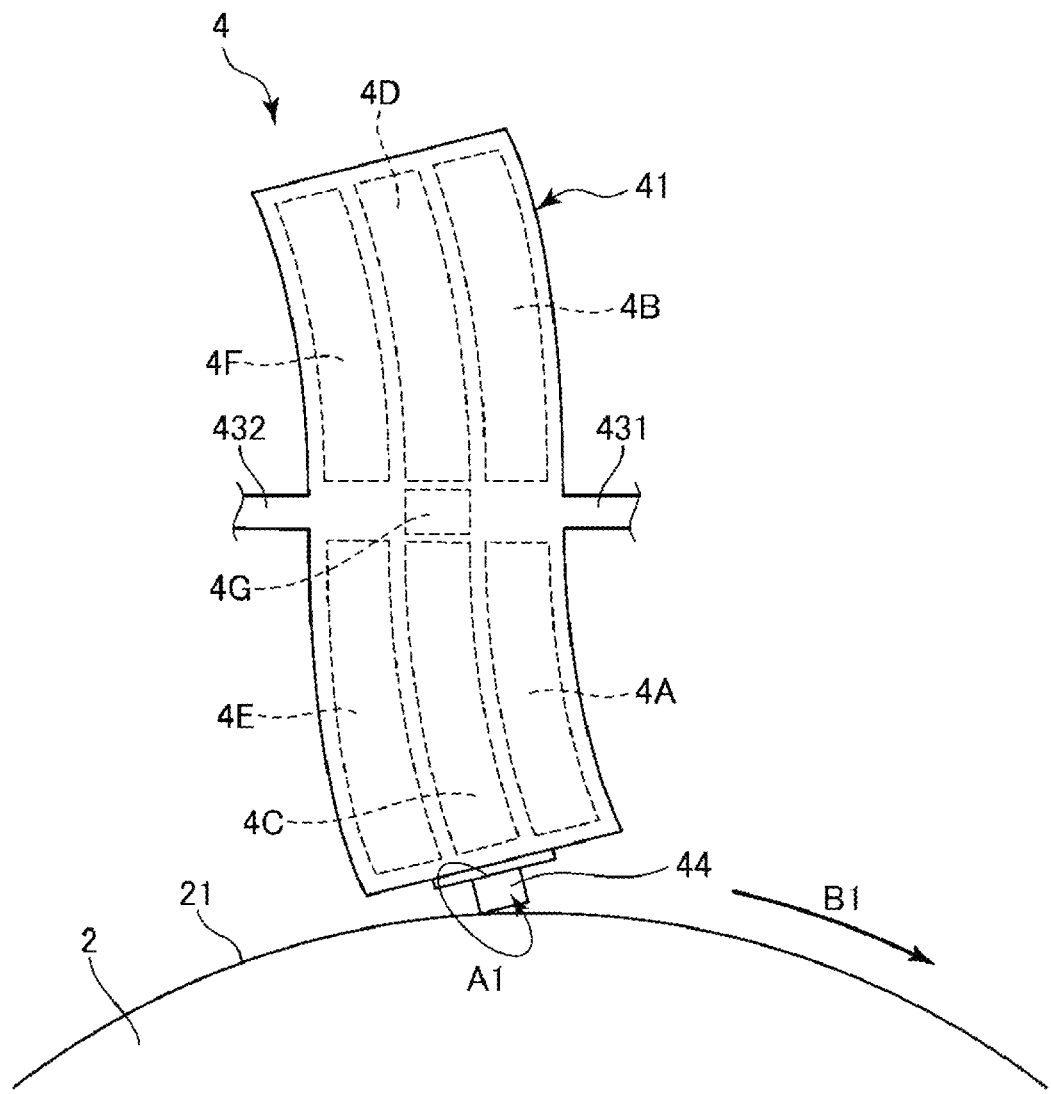
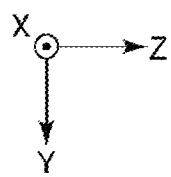

FIG. 8
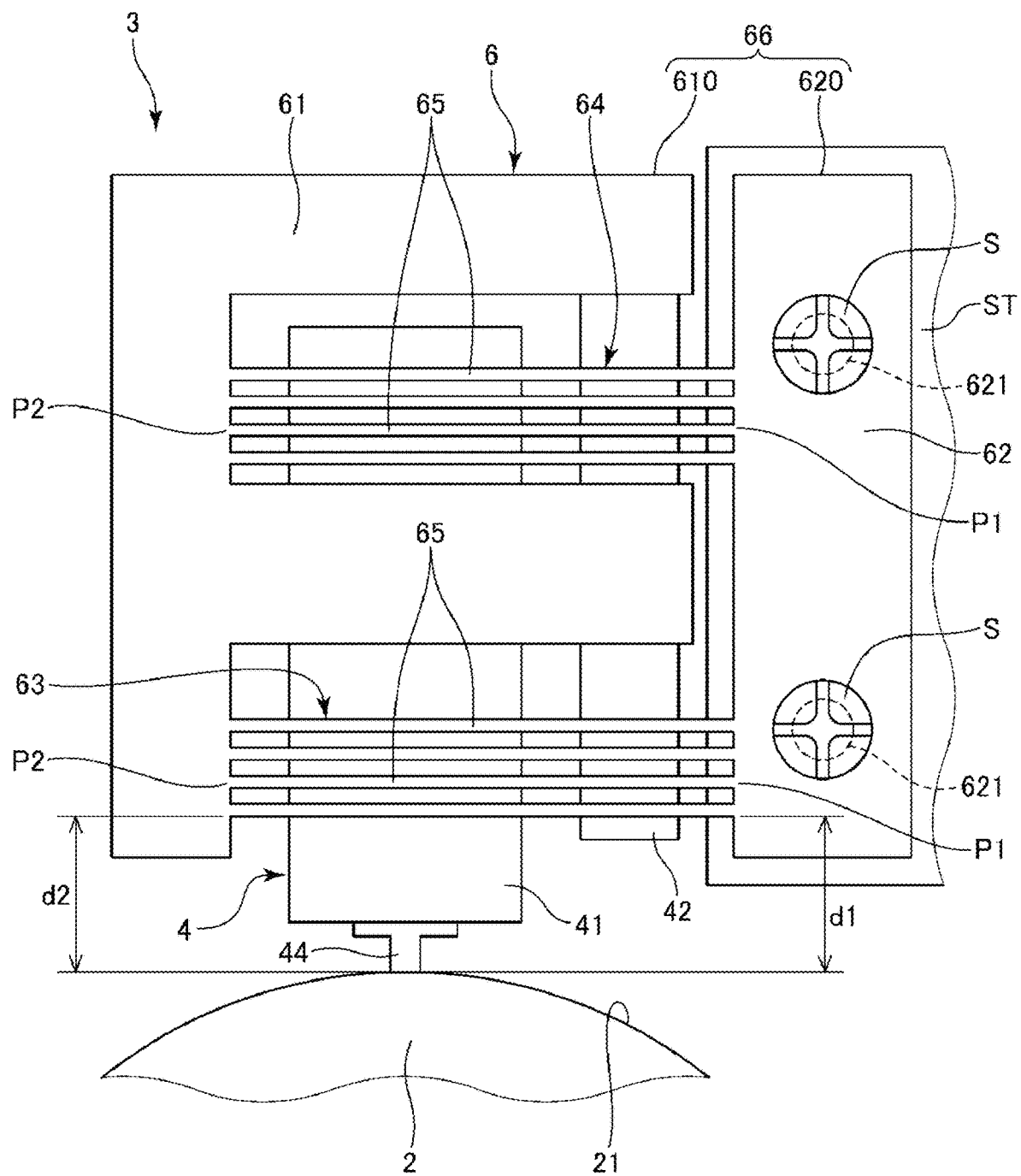
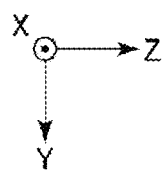

FIG. 13
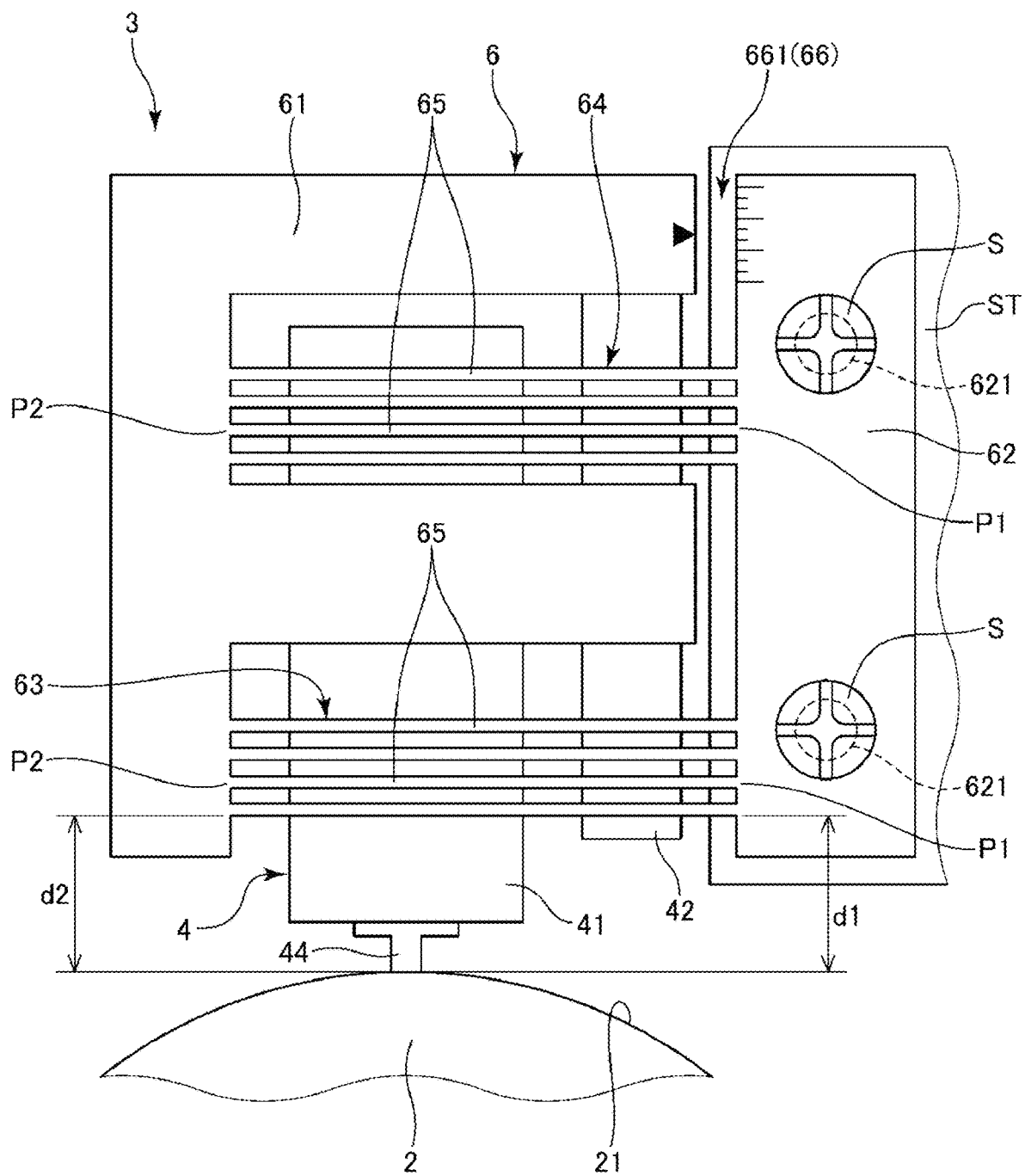
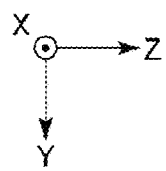

FIG. 17
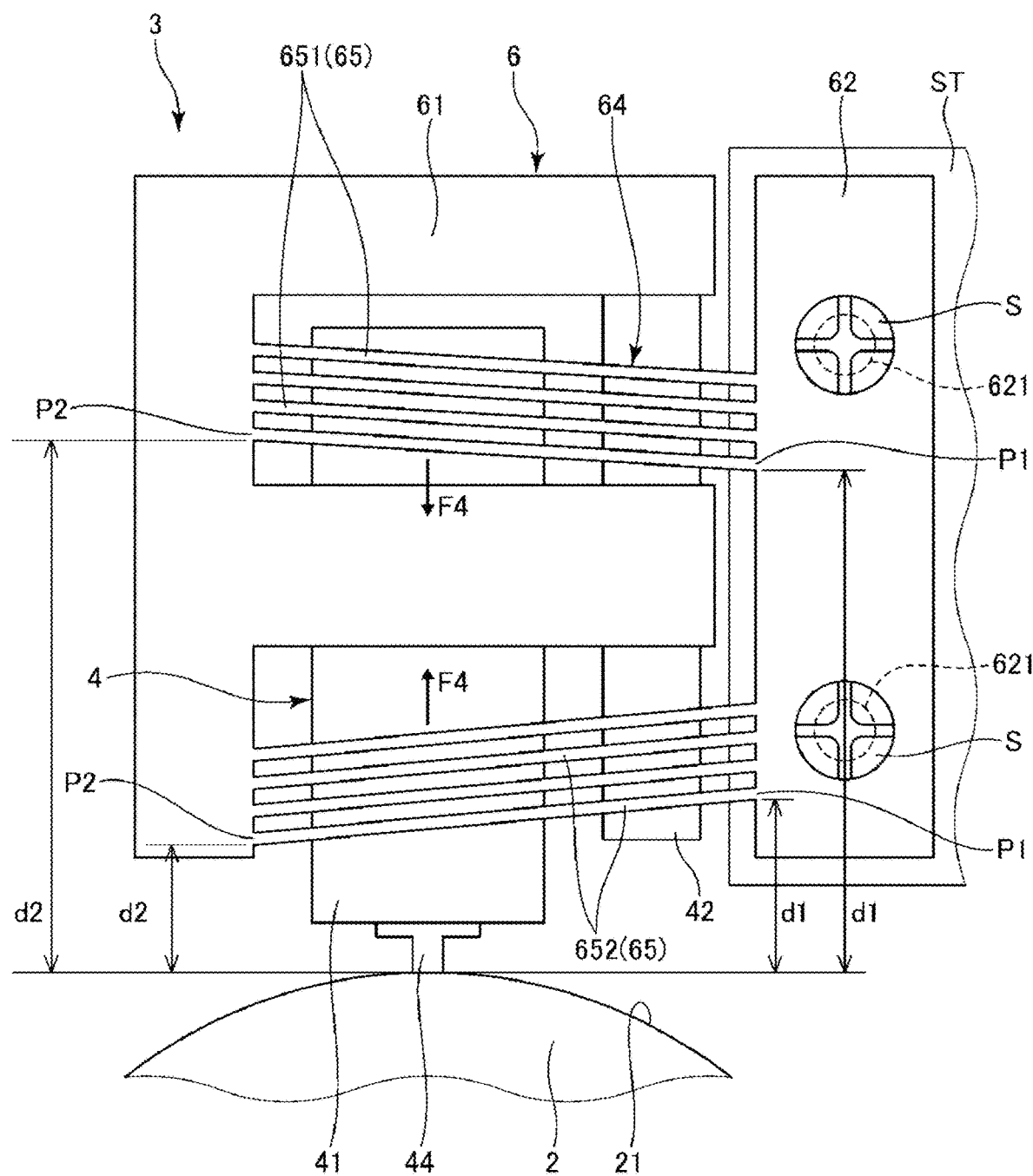
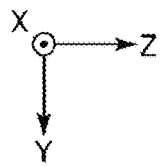

PIEZOELECTRIC DRIVE DEVICE, PIEZOELECTRIC MOTOR, AND ROBOT

The present application is based on, and claims priority from JP Application Serial Number 2020-112530, filed Jun. 30, 2020, the disclosure of which is hereby incorporated by reference herein in its entirety.

BACKGROUND

1. Technical Field

The present disclosure relates to a piezoelectric drive device, a piezoelectric motor, and a robot.

2. Related Art

For example, a piezoelectric motor disclosed in JP-A-2015-186329 has a rotor as a driven unit, a vibrator vibrating by expansion and contraction of a piezoelectric element, and a spring urging the vibrator toward the rotor and pressing the vibrator against the rotor.

However, in the piezoelectric motor in JP-A-2015-186329, the spring extends in directions orthogonal to longitudinal vibration directions of the vibrator in a natural state, and tilts relative to the directions orthogonal to the longitudinal vibration directions of the vibrator in an urging state in which the vibrator is urged. Accordingly, it is difficult to accurately control the rotation of the rotor because an amount of movement or a movement velocity of the rotor differs depending on the rotation direction of the rotor, i.e., between a case of the forward rotation and a case of the backward rotation.

SUMMARY

A piezoelectric drive device according to an aspect of the present disclosure includes a vibrator having a vibrating portion including a piezoelectric element and performing longitudinal vibration and flexural vibration, and a convex portion placed in the vibrating portion and performing an elliptic motion, and an urging member including a base, a holding portion holding the vibrator, and a spring portion coupled to the base at one end and coupled to the holding portion at another end and urging the convex portion toward a driven unit, wherein d1>d2 is satisfied in a natural state in which the vibrator is not urged by the urging member, where a separation distance between the one end and the convex portion along directions of the longitudinal vibration is d1 and a separation distance between the other end and the convex portion along the directions of the longitudinal vibration is d2, and |d1−d2| in an urging state in which the vibrator is urged toward the driven unit by the urging member is smaller than |d1−d2| in the natural state.

BRIEF DESCRIPTION OF THE DRAWINGS

FIG. 5 is a plan view showing a driving state of the piezoelectric actuator.

FIG. 8 is a plan view showing the urging member in an urging state.

FIG. 13 is a plan view showing a modified example of the urging member.

FIG. 17 is a plan view showing an urging state of the urging member shown in FIG. 16.

DESCRIPTION OF EXEMPLARY EMBODIMENTS

As below, a piezoelectric drive device, a piezoelectric motor, and a robot according to the present disclosure will be explained in detail based on preferred embodiments shown in the accompanying drawings.

First Embodiment

Figure 1:
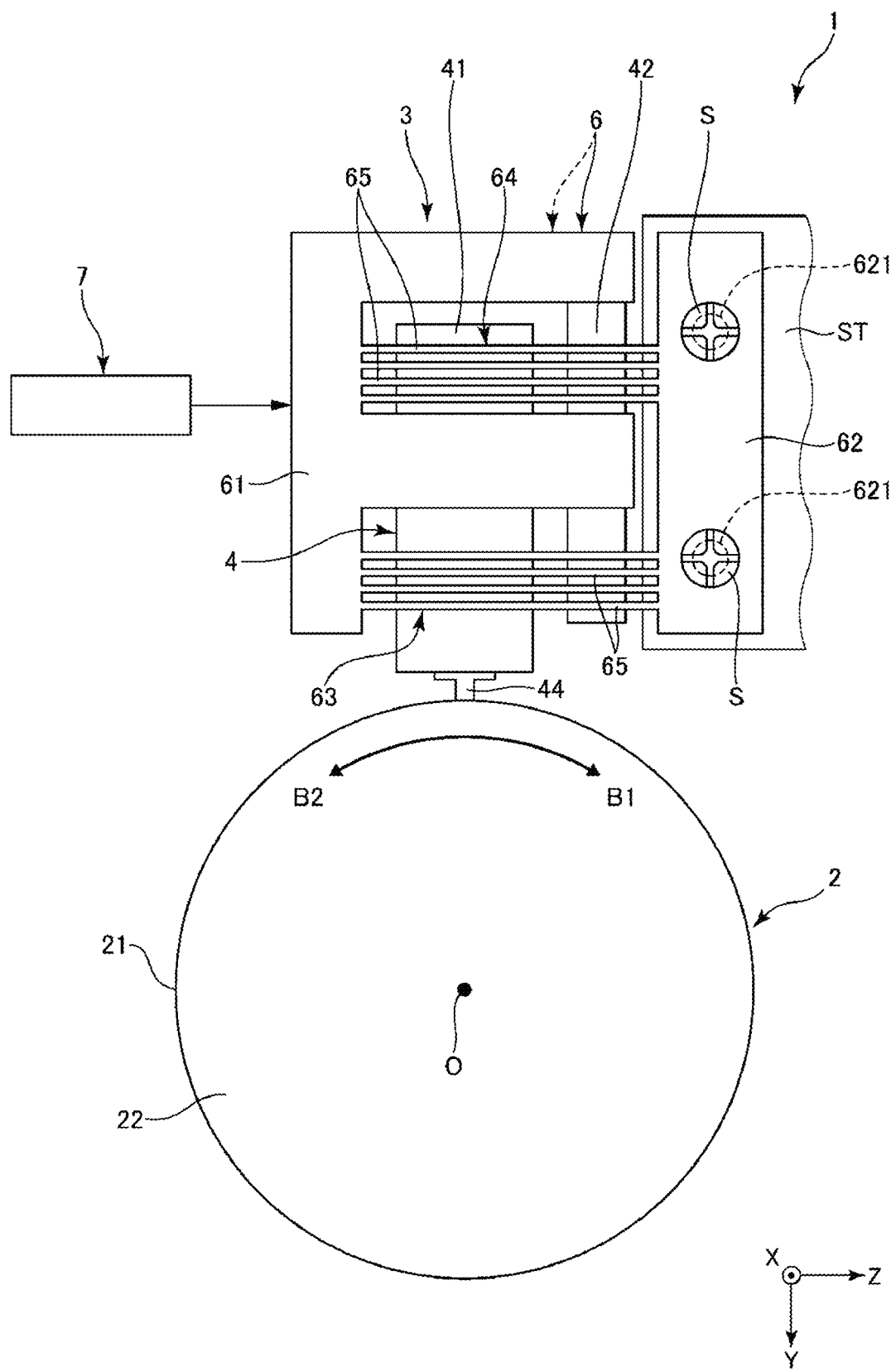
FIG. 1 is a plan view showing a piezoelectric motor according to a first embodiment of the present disclosure.
Figure 2:
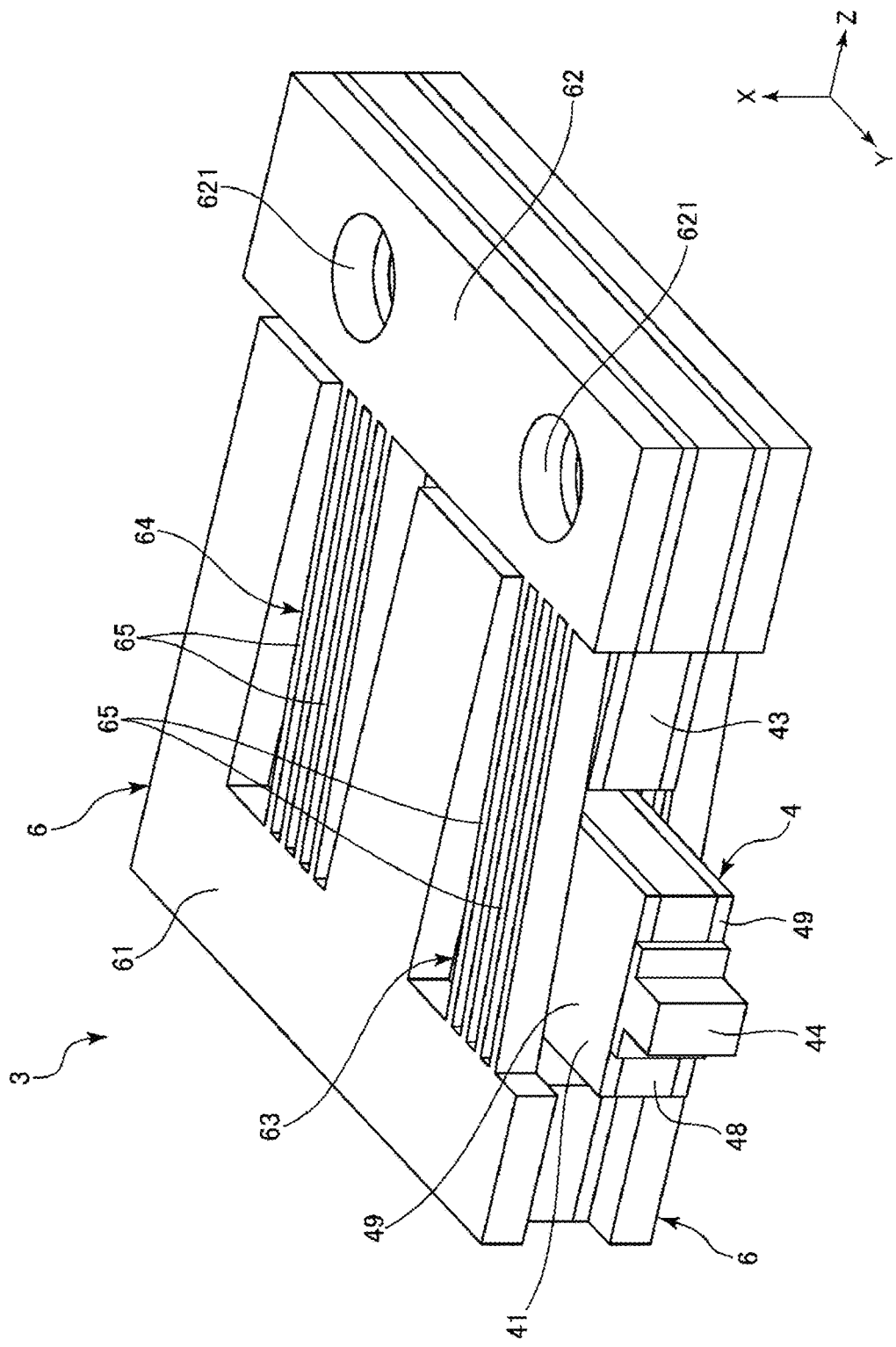
FIG. 2 is a perspective view showing a piezoelectric drive device of the piezoelectric motor.
Figure 3:
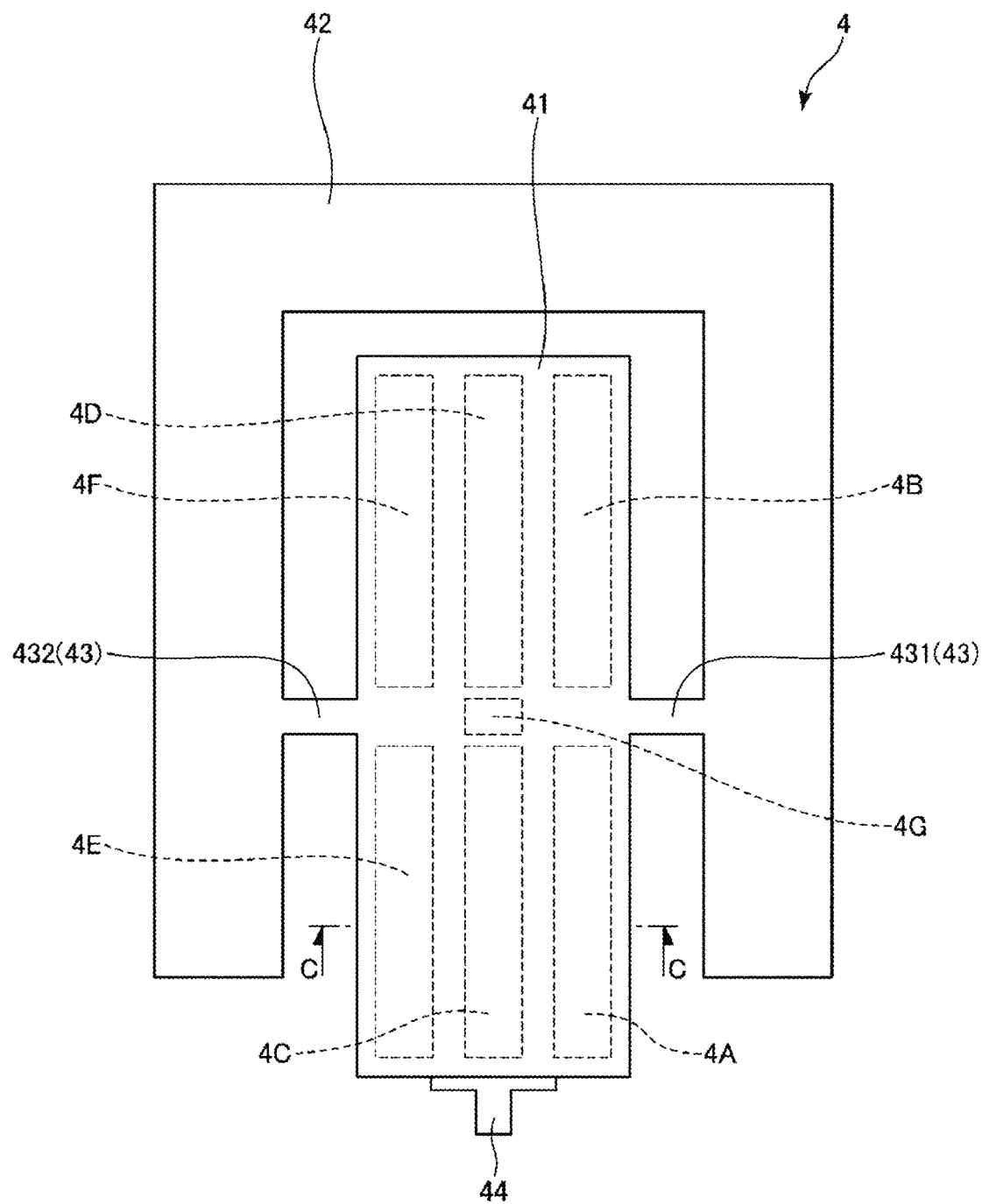
FIG. 3 is a plan view showing a piezoelectric actuator of the piezoelectric drive device.
Figure 4:
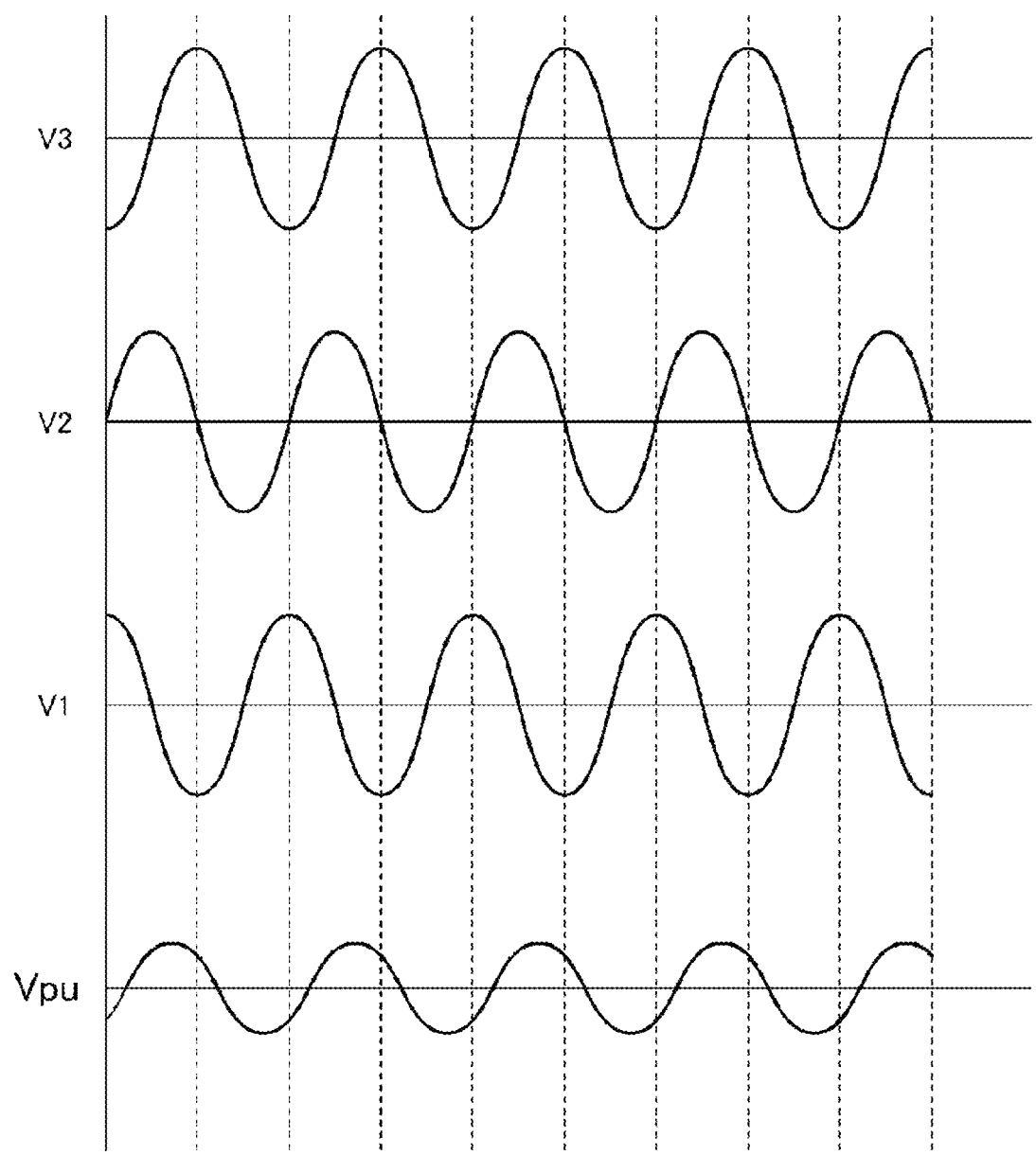
FIG. 4 shows drive signals applied to the piezoelectric actuator.
Figure 6:
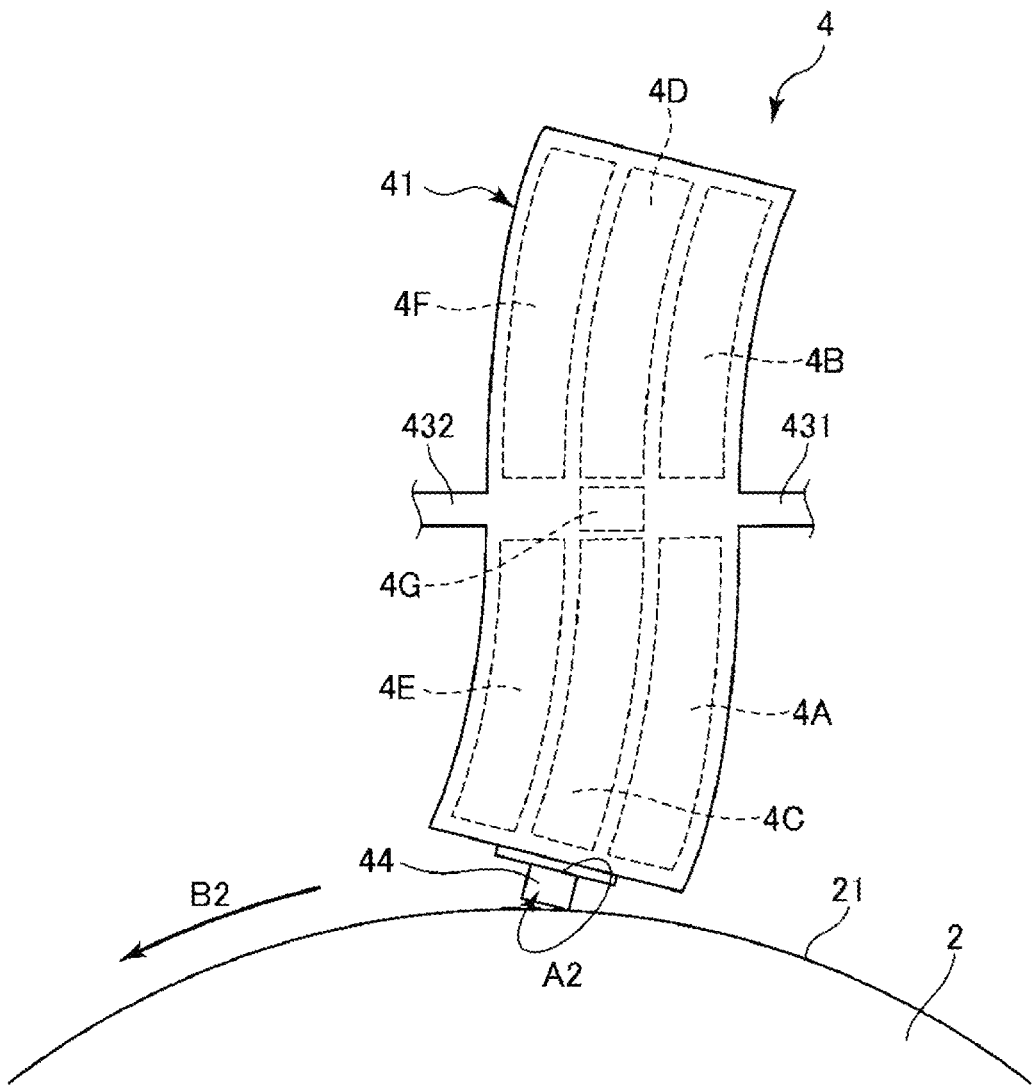
FIG. 6 is a plan view showing a driving state of the piezoelectric actuator.
Figure 7:
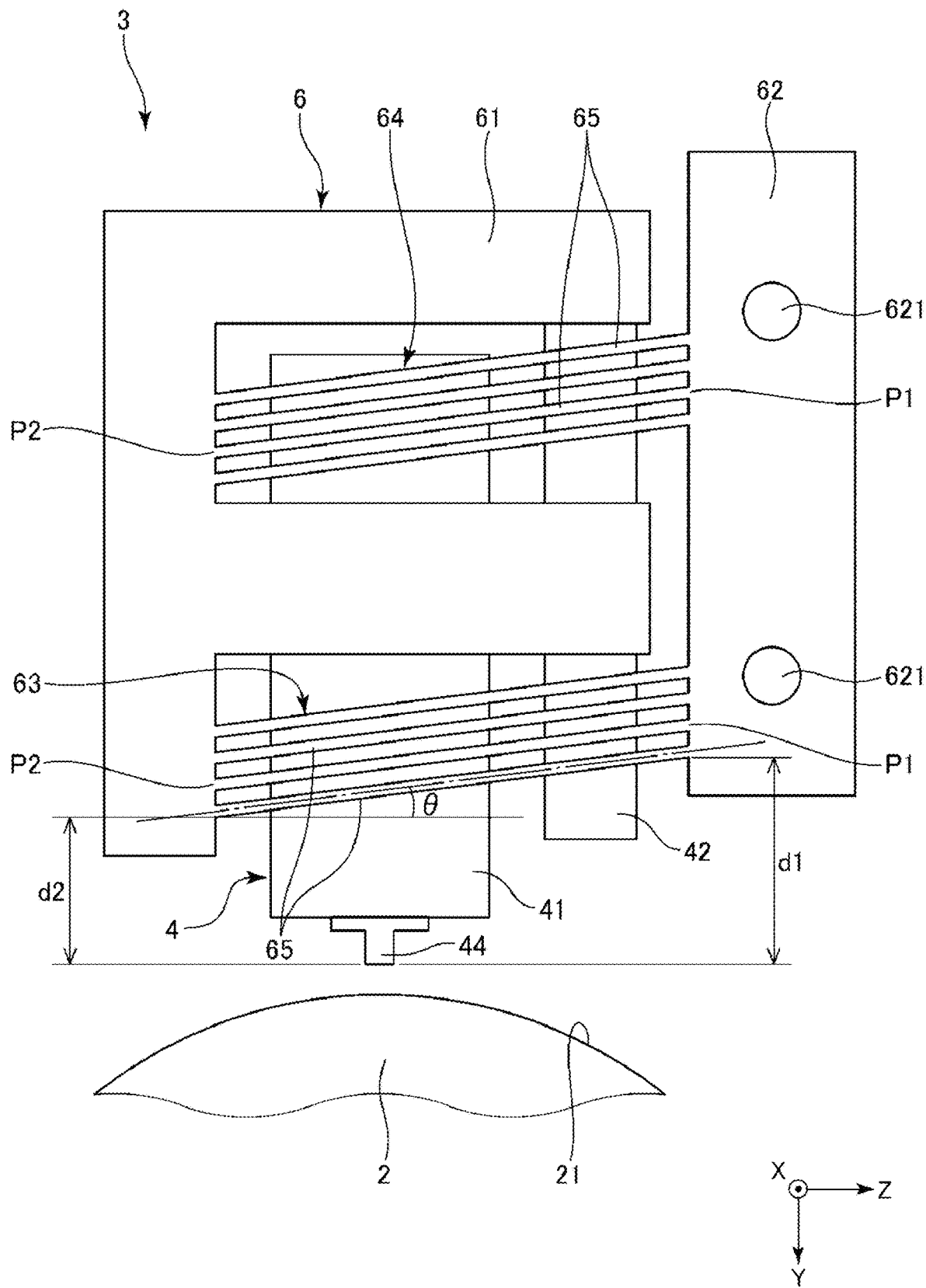
FIG. 7 is a plan view showing an urging member in a natural state.
Figure 9:
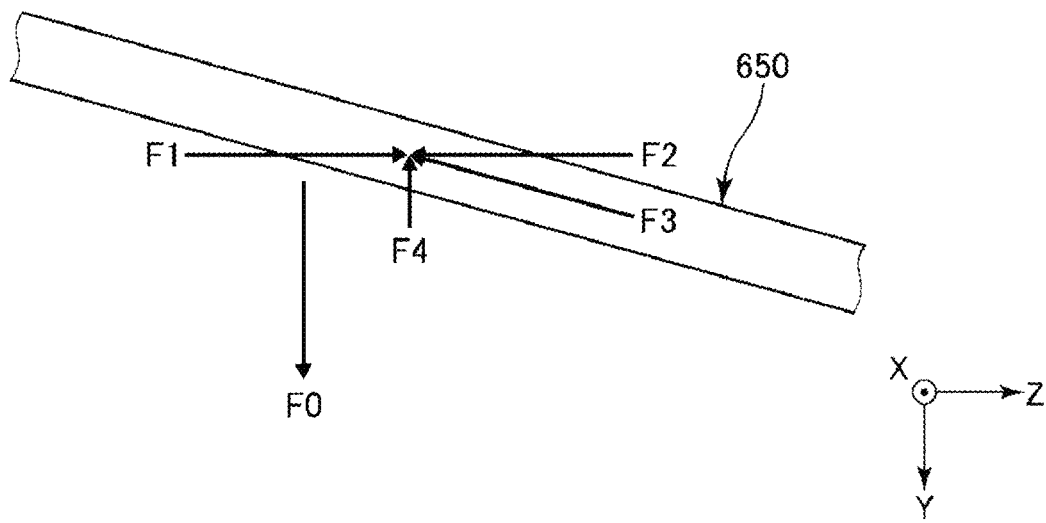
FIG. 9 is a plan view for explanation of a problem occurring in an urging member of related art.
Figure 10:
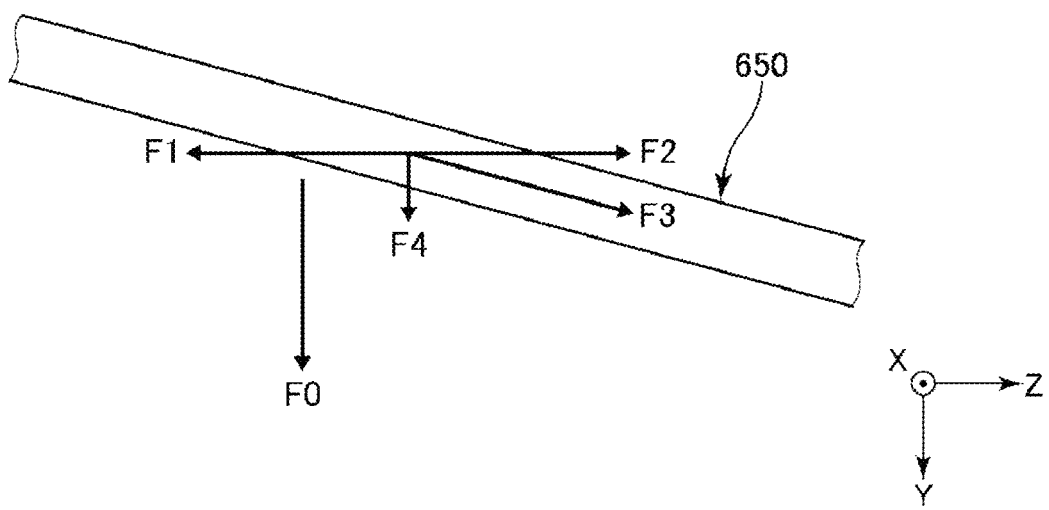
FIG. 10 is a plan view for explanation of the problem occurring in the urging member of related art.
Figure 11:
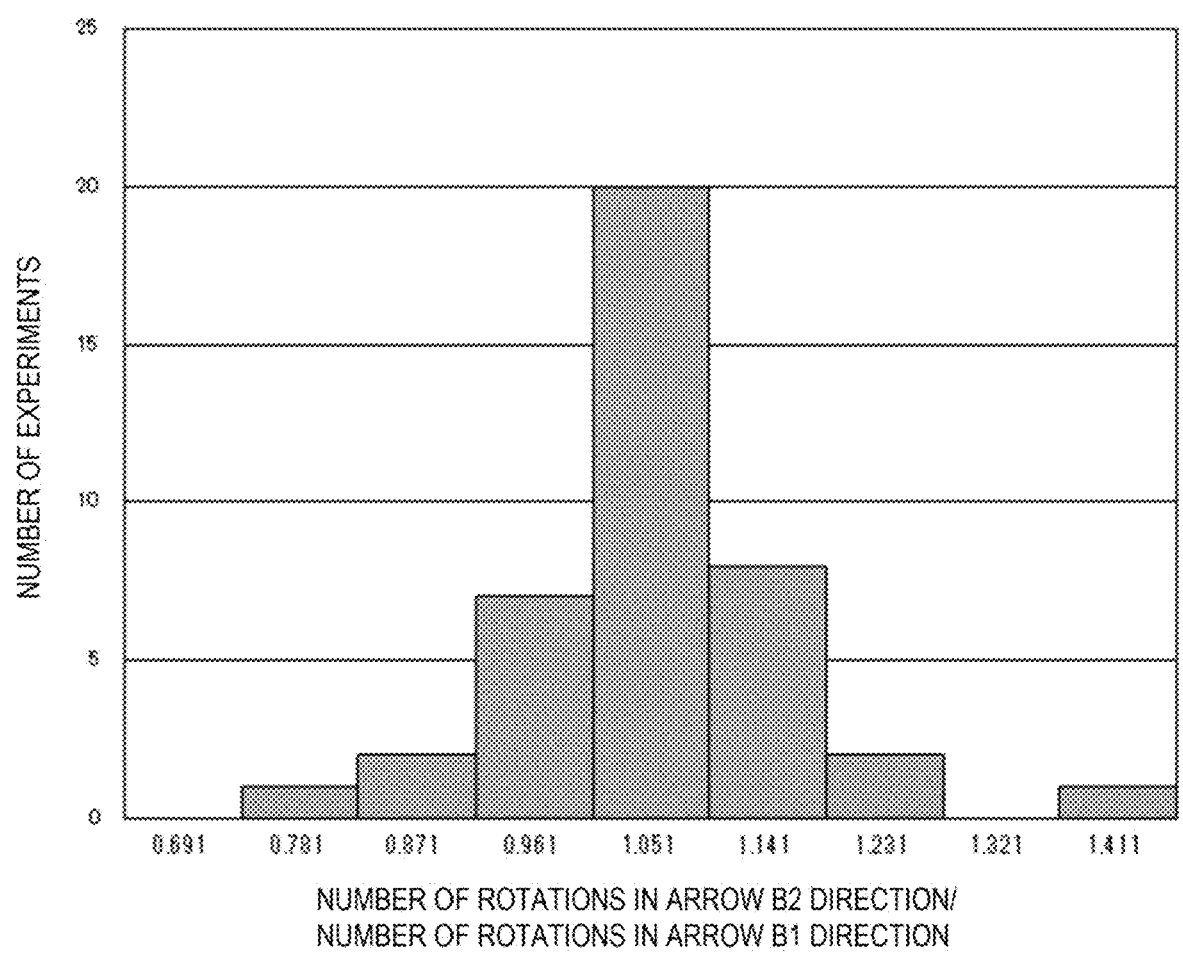
FIG. 11 is a graph showing variations in control by the urging member of related art.
Figure 12:
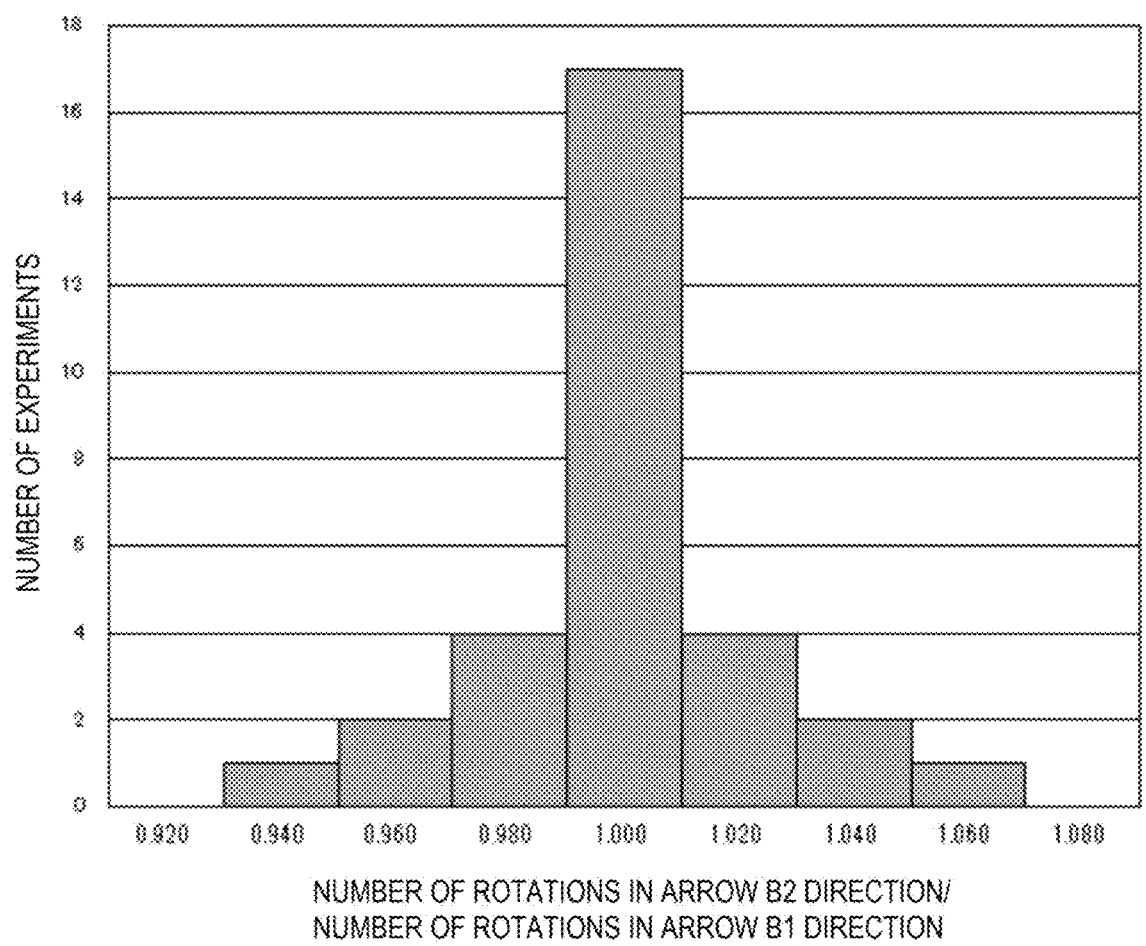
FIG. 12 is a graph showing variations in control by the urging member of the embodiment.

FIG. 1 is a plan view showing a piezoelectric motor according to a first embodiment of the present disclosure. FIG. 2 is a perspective view showing a piezoelectric drive device of the piezoelectric motor. FIG. 3 is a plan view showing a piezoelectric actuator of the piezoelectric drive device. FIG. 4 shows drive signals applied to the piezoelectric actuator. FIGS. 5 and 6 are plan views showing driving states of the piezoelectric actuator. FIG. 7 is a plan view showing an urging member in a natural state. FIG. 8 is a plan view showing the urging member in an urging state. FIGS. 9 and 10 are plan views for explanation of a problem occurring in an urging member of related art. FIG. 11 is a graph showing variations in control by the urging member of related art. FIG. 12 is a graph showing variations in control by the urging member of the embodiment. FIG. 13 is a plan view showing a modified example of the urging member.

Hereinafter, for convenience of explanation, the near side in FIG. 1 is also referred to as "upper" and the far side in FIG. 1 is also referred to as "lower". Further, a rotor side of a piezoelectric actuator is also referred to as "distal end side" and the opposite side to the rotor is also referred to as "proximal end side". Three axes orthogonal to one another are referred to as "X-axis", "Y-axis", and "Z-axis", and directions along the X-axis are also referred to as "X-axis directions", directions along the Y-axis are also referred to as "Y-axis directions", and directions along the Z-axis are also referred to as "Z-axis directions". Further, the arrow-head sides of the respective axes are also referred to as "plus sides" and the opposite sides to the arrow-heads are also referred to as "minus sides". Furthermore, the plus side in the X-axis direction is also referred to as "upper" or "upside" and the minus side in the X-axis direction is also referred to as "lower" or "downside".

As shown in FIG. 1, a piezoelectric motor 1 has a rotor 2 as a driven unit rotatable around a rotation axis O, a piezoelectric drive device 3 in contact with an outer circumferential surface 21 of the rotor 2, and a controller 7 that controls driving of the piezoelectric drive device 3. In the piezoelectric motor 1, the piezoelectric drive device 3 is driven under the control by the controller 7, and thereby, a driving force generated in the piezoelectric drive device 3 is transmitted to the rotor 2 and the rotor 2 rotates around the rotation axis O.

Note that the configuration of the piezoelectric motor 1 is not particularly limited. For example, a plurality of the piezoelectric drive devices 3 may be placed along the circumferential direction of the rotor 2 and the rotor 2 may be rotated by driving of the plurality of piezoelectric drive devices 3. Or, the piezoelectric drive device 3 may be in contact with a principal surface 22 of the rotor 2, not the outer circumferential surface 21 of the rotor 2. Or, the driven unit is not limited to a rotating member like the rotor 2, but may be e.g. a slider that linearly moves.

As shown in FIG. 2, the piezoelectric drive device 3 has a piezoelectric actuator 4 as a vibrator and a pair of urging members 6, 6 placed with the piezoelectric actuator 4 in between. Further, as shown in FIG. 3, the piezoelectric actuator 4 has a vibrating portion 41, a supporting portion 42 supporting the vibrating portion 41, a coupling portion 43 coupling the vibrating portion 41 and the supporting portion 42, and a convex portion 44 fixed to the distal end part of the vibrating portion 41 and transmitting vibration of the vibrating portion 41 to the rotor 2.

The vibrating portion 41 is formed in a plate-like shape spreading on the YZ-plane containing the Y-axis and the Z-axis having a thickness in the X-axis directions as a thickness direction. Further, the vibrating portion 41 flexurally vibrates in S shapes by bending in the Z-axis directions while expanding and contracting in the Y-axis directions. Furthermore, the vibrating portion 41 has an elongated shape elongated in the Y-axis directions as the expansion and contraction directions, particularly, a rectangular shape in the embodiment in a plan view. Note that the shape of the vibrating portion 41 is not particularly limited as long as the portion may exert the function thereof.

The vibrating portion 41 has piezoelectric elements 4A to 4F for driving that flexurally vibrate the vibrating portion 41 and a piezoelectric element 4G for detection that detects the vibration of the vibrating portion 41. In the center part of the vibrating portion 41, the piezoelectric elements 4C, 4D are arranged in the Y-axis directions. Further, the piezoelectric elements 4A, 4B are arranged in the Y-axis directions at the plus sides in the Z-axis directions of the piezoelectric elements 4C, 4D, and the piezoelectric elements 4E, 4F are arranged in the Y-axis directions at the minus sides in the Z-axis directions. These piezoelectric elements 4A to 4F respectively expand and contract by energization. Note that the number and the placement of piezoelectric elements for driving are not particularly limited as long as the elements may flexurally vibrate the vibrating portion 41.

The piezoelectric element 4G is placed between the piezoelectric elements 4C, 4D. An external force according to the flexural vibration of the vibrating portion 41 is applied to the piezoelectric element 4G, and the element outputs a detection signal according to the applied external force. Accordingly, the piezoelectric drive device 3 may sense the vibration state of the vibrating portion 41 based on the detection signal output from the piezoelectric element 4G. Note that the number and the placement of piezoelectric elements for detection are not particularly limited as long as the elements may detect the vibration of the vibrating portion 41. Or, the piezoelectric element for detection may be omitted.

As shown in FIG. 2, the vibrating portion 41 has a configuration in which a pair of substrates 49, 49 sandwich a piezoelectric element layer 48 including the piezoelectric elements 4A to 4G. The respective substrates 49 are e.g. silicon substrates. Each of the piezoelectric elements 4A to 4F has a configuration in which a pair of electrodes sandwich a piezoelectric material. Note that the constituent material for the piezoelectric material is not particularly limited, but piezoelectric ceramics including e.g. lead zirconate titanate (PZT), barium titanate, lead titanate, potassium niobate, lithium niobate, lithium tantalate, sodium tungstate, zinc oxide, barium strontium titanate (BST), strontium bismuth tantalate (SBT), lead metaniobate, and lead scandium niobate may be used. As the piezoelectric material, not only the above described piezoelectric ceramics but also polyvinylidene fluoride, quartz crystal, or the like may be used.

The method of forming the piezoelectric material is not particularly limited, but may be formed from a bulk material or using the sol-gel method or sputtering method. In the embodiment, the piezoelectric material is formed using the sol-gel method. Thereby, for example, compared to a case of formation from a bulk material, a thinner piezoelectric material may be obtained and the thickness of the piezoelectric actuator 4 may be reduced.

As shown in FIG. 2, the convex portion 44 is provided in the distal end part of the vibrating portion 41 and projects from the vibrating portion 41 toward the plus side in the Y-axis direction. The distal end part of the convex portion 44 is in contact with the outer circumferential surface 21 of the rotor 2 and pressed by the urging members 6. Accordingly, the vibration of the vibrating portion 41 is transmitted to the rotor 2 via the convex portion 44. The constituent material of the convex portion 44 is not particularly limited to, but includes e.g. various ceramics such as zirconia, alumina, and titania. Thereby, the convex portion 44 having high durability is obtained.

The supporting portion 42 has a function of supporting the vibrating portion 41. The supporting portion 42 has a U-shape surrounding both lateral sides and the distal end side of the vibrating portion 41 in the plan view. Note that the configuration of the supporting portion 42 is not particularly limited as long as the portion may exert the function.

The coupling portion 43 couples a part as a node of the flexural vibration of the vibrating portion 41, specifically, the center part in the Y-axis directions and the supporting portion 42. The coupling portion 43 has a first coupling part 431 located at the plus side in the Z-axis direction of the vibrating portion 41 and coupling the vibrating portion 41 and the supporting portion 42, and a second coupling part 432 located at the minus side in the Z-axis direction of the vibrating portion 41 and coupling the vibrating portion 41 and the supporting portion 42.

Note that the configuration of the coupling portion 43 is not particularly limited as long as the portion may exert the function. For example, the first, second coupling parts 431, 432 of the embodiment are respectively formed by single beams, however, may be formed by a plurality of beams. Or, the first, second coupling parts 431, 432 of the embodiment respectively have shapes extending straight in the Z-axis directions, however, may be bent or curved in the middle or may have widths or thicknesses changing in the middle.

The controller 7 has e.g. a processor including a computer and processing information, a memory communicably coupled to the processor, and an external interface. Further, a program that can be executed by the processor is stored in the memory and the processor reads and executes the program stored in the memory. The controller 7 receives a command from a host computer (not shown) and drives the piezoelectric actuator 4 according to the command.

For example, when a drive signal V1 shown in FIG. 4 is applied to the piezoelectric elements 4A, 4F, a drive signal V2 is applied to the piezoelectric elements 4C, 4D, and a drive signal V3 is applied to the piezoelectric elements 4B, 4E, as shown in FIG. 5, the vibrating portion 41 flexurally vibrates in an inverted S shape in the Z-axis directions while stretchingly vibrating in the Y-axis directions and, these vibrations are synthesized and the distal end of the convex portion 44 makes an elliptic motion tracing an elliptic trajectory counterclockwise as shown by an arrow A1. Thereby, the rotor 2 is driven and the rotor 2 rotates clockwise as shown by an arrow B1. A detection signal Vpu according to the stretching vibration in the Y-axis directions contained in the flexural vibration of the vibrating portion 41 is output from the piezoelectric element 4G.

When the waveforms of the drive signals V1, V3 are switched, as shown in FIG. 6, the vibrating portion 41 flexurally vibrates in an S shape in the Z-axis directions while stretchingly vibrating in the Y-axis directions and, these vibrations are synthesized and the convex portion 44 makes an elliptic motion clockwise as shown by an arrow A2. Thereby, the rotor 2 is driven and the rotor 2 rotates counterclockwise as shown by an arrow B2. The detection signal Vpu according to the stretching vibration in the Y-axis directions contained in the flexural vibration of the vibrating portion 41 is output from the piezoelectric element 4G.

Note that, hereinafter, the stretching vibration in the Y-axis directions of the vibrating portion 41 is also referred to as "longitudinal vibration".

As described above, the pair of urging members 6, 6 sandwich the piezoelectric actuator 4 from both sides in the X-axis directions. That is, one urging member 6 is placed at the plus side in the X-axis direction of the piezoelectric actuator 4 and the other urging member 6 is placed at the minus side in the X-axis direction. Thereby, the piezoelectric actuator 4 may be urged with balance from both sides in the thickness directions thereof. Accordingly, variations in posture of the piezoelectric actuator 4, particularly, tilts in the X-axis directions may be suppressed and the driving force generated in the piezoelectric actuator 4 may be efficiently transmitted to the rotor 2. Therefore, the piezoelectric drive device 3 having high drive efficiency is obtained. Note that, not limited to that, but one of the urging members 6 may be omitted.

The pair of urging members 6, 6 have the same configuration as each other. As below, for convenience of explanation, the urging member 6 located at the plus side in the X-axis direction relative to the piezoelectric actuator 4 will be representatively explained and the explanation of the urging member 6 located at the minus side in the X-axis direction will be omitted.

The urging member 6 has a function of urging the piezoelectric actuator 4 toward the rotor 2 and pressing the convex portion 44 against the outer circumferential surface 21 of the rotor 2. As shown in FIGS. 7 and 8, the urging member 6 is joined to the upper surface of the piezoelectric actuator 4 via a joining member (not shown) and has a holding portion 61 that holds the piezoelectric actuator 4, a base 62 for fixing the piezoelectric drive device 3 to a stage ST, and a pair of spring groups 63, 64 coupling the holding portion 61 and the base 62.

These holding portion 61, base 62, and spring groups 63, 64 are integrally formed. Thereby, for example, the urging member 6 having a higher mechanical strength than a configuration in which the respective separately formed portions are coupled and easily formed is obtained. The holding portion 61, the base 62, and the spring groups 63, 64 may be integrally formed from e.g. a silicon substrate. Thereby, the urging member 6 having sufficient mechanical strength and elasticity may be obtained. Further, the silicon wafer process may be used and the urging member 6 may be manufactured with higher processing accuracy. The difference in coefficient of thermal expansion from the piezoelectric actuator 4 may be made smaller, and thereby, generation of thermal stress may be reduced and deflection, distortion, etc. of the piezoelectric actuator 4 may be suppressed.

Note that the holding portion 61, the base 62, and the spring groups 63, 64 may be separately formed. The constituent material of the urging member 6 is not particularly limited, but e.g. various resin materials, various metal materials, various glass materials, various ceramic materials, or the like may be used.

The holding portion 61 is joined to the upper surface of the supporting portion 42 of the piezoelectric actuator 4. To prevent contact with the vibrating portion 41, a concave portion open toward the lower surface is formed in a part of the holding portion 61 overlapping with the vibrating portion 41. Thereby, the contact between the holding portion 61 and the vibrating portion 41 is suppressed. Thus, the vibration of the vibrating portion 41 is not hindered and the piezoelectric drive device 3 may be driven more stably.

The base 62 is located at the plus side in the Z-axis direction of the holding portion 61. The base 62 is a part for fixing the piezoelectric drive device 3 to the stage ST. In the embodiment, two insertion holes 621 for screws are formed in the base 62 and, as shown in FIG. 8, the base 62 is fixed to the stage ST by screws S inserted through the insertion holes 621. Note that the method of fixing the base 62 and the stage ST is not particularly limited.

The spring groups 63, 64 are placed between the holding portion 61 and the base 62. Further, the spring groups 63, 64 are arranged in the Y-axis directions as the urging directions of the piezoelectric actuator 4. As described above, the spring groups 63, 64 are placed side by side in the Y-axis directions, and thereby, the piezoelectric actuator 4 may be urged toward the rotor 2 more stably with a stronger urging force.

Each of the spring groups 63, 64 has a plurality of spring portions 65 arranged with an equal pitch in the Y-axis directions. Further, each of the plurality of spring portions 65 has a first end P1 as an end at the plus side in the Z-axis direction coupled to the base 62 and a second end P2 as an end at the minus side in the Z-axis direction coupled to the holding portion 61. The piezoelectric drive device 3 is fixed to the stage ST with the plurality of spring portions 65 elastically deformed in the Y-axis directions, and thereby, the piezoelectric actuator 4 is urged in the Y-axis directions and the convex portion 44 is pressed against the outer circumferential surface 21 of the rotor 2.

Note that the spring portion 65 is thinner than the holding portion 61 and the base 62 and is placed closer to the upside. Accordingly, air gaps for suppressing contacts and interferences are formed between the spring portions 65 and the vibrating portion 41. Thereby, deformation of the spring portions 65 and vibration of the vibrating portion 41 are not hindered and the piezoelectric drive device 3 may be driven more stably.

Next, configurations of the plurality of spring portions 65 will be explained in detail. These are the same configuration as one another and, as below, for convenience of explanation, the single spring portion 65 will be explained and the explanation of the other spring portions 65 will be omitted.

First, prior to the explanation of the spring portion 65, a problem of a spring portion 650 of related art is briefly explained. When the piezoelectric actuator 4 is urged, the spring portion 650 of related art extends along directions inclined relative to the Z-axis directions orthogonal to the Y-axis directions as the directions of the longitudinal vibration of the vibrating portion 41 in the plan view from the X-axis directions. Accordingly, when the rotor 2 rotates in the direction of the arrow B1, forces shown in FIG. 9 are applied to the spring portion 650 and, when the rotor rotates in the opposite direction of the arrow B2, forces shown in FIG. 10 are applied to the spring portion 650. Note that the force F0 shown in FIGS. 9 and 10 is an urging force when the rotor 2 stops, the force F1 is a force applied to the spring portion 650 by the friction force generated between the convex portion 44 and the rotor 2, the force F3 is a reaction force of the spring generated to the force F1, the force F2 and the force F4 are forces by resolution of the force F3, and the force F3 is generated to balance the force F1 and the force F2.

As seen from the drawings, when the rotor 2 rotates in the direction of the arrow B1, the force F0 and the force F4 in the opposite direction are synthesized and the actual urging force becomes smaller than F0. On the other hand, when the rotor 2 rotates in the direction of the arrow B2, the force F0 and the force F4 in the same direction are synthesized and the actual urging force becomes larger than F0. Accordingly, there is a problem that the amount of movement or the movement velocity of the rotor 2 differs depending on the rotation direction of the rotor 2 and accurate control of the rotation of the rotor 2 is difficult. Actually, as a result of an experiment using the spring portion 650 of related art by the inventor, as shown in FIG. 11, it is known that the number of rotations in the direction of the arrow B1 and the number of rotations in the direction of the arrow B2 differ. Further, it is also known that torque in the direction of the arrow B1 and torque in the direction of the arrow B2 similarly differ to the number of rotations (not shown).

Therefore, in the embodiment, the spring portion 65 is configured so that the tilt relative to the Z-axis directions of the spring portion 65 in the urging state may be smaller. As shown in FIG. 7, in a natural state in which the urging member 6 does not urge the piezoelectric actuator 4 and an external force is not substantially applied to the urging member 6, the spring portion 65 extends along the direction inclined relative to the Z-axis orthogonal to the Y-axis directions as the directions of the longitudinal vibration of the vibrating portion 41 in the plan view from the X-axis directions. Accordingly, when a separation distance between the first end P1 of the spring portion 65 and the distal end part of the convex portion 44 along the Y-axis directions as the directions of the longitudinal vibration of the vibrating portion 41 is d1 and a separation distance between the second end P2 of the spring portion 65 and the distal end part of the convex portion 44 along the Y-axis directions as the directions of the longitudinal vibration of the vibrating portion 41 is d2, d1>d2 is satisfied in the natural state.

As shown in FIG. 8, in the urging state in which the urging member 6 urges the piezoelectric actuator 4 and presses the convex portion 44 against the rotor 2, a tilt θ of the spring portion 65 relative to the Z-axis directions is smaller than that in the natural state and the spring portion 65 is substantially parallel to the Z-axis. That is, when |d1−d2| in the natural state is D1 and |d1−d2| in the urging state is D2, D1>D2 is satisfied. Thereby, the tilt θ of the spring portion 65 in the urging state relative to the Z-axis is smaller and the above described force F3 may be suppressed to be smaller. Accordingly, the above described problem occurring in the spring portion 650 of related art is relieved. As a result, the amount of movement or the movement velocity of the rotor 2 is hard to differ between the rotation in the direction of the arrow B1 and the rotation in the direction of the arrow B2, and the rotation of the rotor 2 may be accurately controlled. Note that the tilt θ refers to an angle formed by a line segment connecting the first end P1 and the second end P2 and the Z-axis.

Actually, as a result of an experiment using the spring portion 65 of the embodiment by the inventor, as shown in FIG. 12, it is known that the difference between the number of rotations in the direction of the arrow B1 and the number of rotations in the direction of the arrow B2 is reduced compared to that of related art. Similarly, not shown, it is also known that the difference between the torque in the direction of the arrow B1 and the torque in the direction of the arrow B2 is reduced compared to that of related art. Therefore, it is clear that the above described effect is exerted.

Note that, not particularly limited as long as D1>D2 is satisfied, but, for example, D2/D1≤0.5 is preferable, D2/D1≤0.3 is more preferable, and D2/D1≤0.1 is even more preferable. Further, the tilt θ in the urging state is not particularly limited to, but preferably equal to or smaller than 10°, more preferably equal to or smaller than 5°, and even more preferably equal to or smaller than 1°. Thereby, in the urging state, the spring portion 65 may be brought closer into parallel to the Z-axis. Therefore, the above described effect is more remarkable.

Particularly, in the embodiment, as shown in FIG. 8, when the urging member 6 presses the convex portion 44 against the rotor 2 with a target urging force, D2=0 is satisfied, that is, d1=d2 and the spring portion 65 is parallel to the Z-axis. Thereby, the above described effect becomes more remarkable and the amount of movement or the movement velocity of the rotor 2 does not substantially differ between the rotation in the direction of the arrow B1 and the rotation in the direction of the arrow B2, and the rotation of the rotor 2 may be controlled more accurately.

Further, the urging member 6 has an indicator mechanism 66 as an indicator unit indicating magnitude of |d1−d2| based on the relative position relationship between the base 62 and the holding portion 61. Thereby, the tilt θ of the spring portion 65 may be easily visually recognized and the spring portion 65 may be easily set to the target tilt θ, preferably 0°, that is, in parallel to the Z-axis. Particularly, the indicator mechanism 66 of the embodiment indicates the magnitude of |d1−d2| based on the relative position relationship between a proximal end part 610 of the holding portion 61 and a proximal end part 620 of the base 62 and, as shown in FIG. 8, when the proximal end parts 610, 620 are aligned in the Z-axis directions, D2=0 is satisfied, that is, d1=d2. Accordingly, the tilt θ of the spring portion 65 may be easily set to 0° only by fixation of the base 62 to the stage ST so that the proximal end parts 610, 620 may be aligned in the Z-axis directions. Thereby, placement of the piezoelectric drive device 3 is easier.

Note that the configuration of the indicator mechanism 66 is not limited to that, but, for example, as shown in FIG. 13, a scale 661 indicating the magnitude of |d1−d2| may be placed on the holding portion 61 and the base 62 and |d1−d2| may be set to desired magnitude by adjustment of the scale 661.

As above, the piezoelectric motor 1 is explained. As described above, the piezoelectric drive device 3 contained in the piezoelectric motor 1 includes the piezoelectric actuator 4 as the vibrator having the vibrating portion 41 with the piezoelectric elements 4A to 4F and performing the longitudinal vibration and the flexural vibration, the convex portion 44 placed in the vibrating portion 41 and performing the elliptic motion, and the urging member 6 having the base 62, the holding portion 61 holding the piezoelectric actuator 4, and the spring portion 65 coupled to the base 62 at the first end P1 as one end and coupled to the holding portion 61 at the second end P2 as the other end and urging the convex portion 44 toward the rotor 2 as the driven unit. Further, when the separation distance along the Y-axis directions as the directions of the longitudinal direction between the first end P1 and the convex portion 44 is d1 and the separation distance along the Y-axis directions as the directions of the longitudinal direction between the second end P2 and the convex portion 44 is d2, in the natural state in which the piezoelectric actuator 4 is not urged by the urging member 6, d1>d2 is satisfied, and |d1−d2| in the urging state in which the piezoelectric actuator 4 is urged toward the rotor 2 by the urging member 6 is smaller than |d1−d2| in the natural state. According to the configuration, the tilt θ of the spring portion 65 relative to the Z-axis in the urging state may be set to be smaller. Accordingly, the amount of movement or the movement velocity of the rotor 2 is hard to differ between the rotation in the direction of the arrow B1 and the rotation in the direction of the arrow B2, and the rotation of the rotor 2 may be accurately controlled.

Further, as described above, in the urging state, d1=d2 is satisfied. Thereby, in the urging state, the spring portion 65 is parallel to the Z-axis orthogonal to the Y-axis directions as the directions of the longitudinal vibration, and the amount of movement or the movement velocity of the rotor 2 is harder to differ between the rotation in the direction of the arrow B1 and the rotation in the direction of the arrow B2 and the rotation of the rotor 2 may be controlled more accurately.

As described above, the base 62, the holding portion 61, and the spring portion 65 are integrally formed. Thereby, the urging member 6 having the higher mechanical strength than the configuration in which the respective separately formed portions are coupled and easily formed is obtained.

Further, as described above, the spring portion 65 extends in the directions inclined relative to the Z-axis directions orthogonal to the Y-axis directions along the longitudinal vibration in the plan view. Thereby, d1>d2 may be set in the natural state by the simple configuration.

As described above, the urging member 6 has the indicator mechanism 66 as the indicator unit indicating the magnitude of |d1−d2| based on the relative position relationship between the base 62 and the holding portion 61. Thereby, the tilt θ of the spring portion 65 may be easily visually recognized and the spring portion 65 may be easily set to the target tilt θ, preferably 0°.

Further, as described above, the indicator mechanism 66 indicates d1=d2 when the proximal end part 610 of the holding portion 61 as the opposite end part to the convex portion 44 and the proximal end part 620 of the base 62 as the opposite end part to the convex portion 44 are aligned in the Z-axis directions orthogonal to the Y-axis directions along the longitudinal vibration. Accordingly, the tilt θ of the spring portion 65 may be easily set to 0° only by fixation of the base 62 to the stage ST so that the proximal end parts 610, 620 are aligned in the Z-axis directions. Thereby, the placement of the piezoelectric drive device 3 is easier.

As described above, the piezoelectric motor 1 has the piezoelectric drive device 3 and the rotor 2 as the driven unit driven by the vibration of the piezoelectric actuator 4. Thereby, the piezoelectric motor 1 may enjoy the above described effect of the piezoelectric drive device 3 and may exert higher reliability.

Second Embodiment

Figure 14:
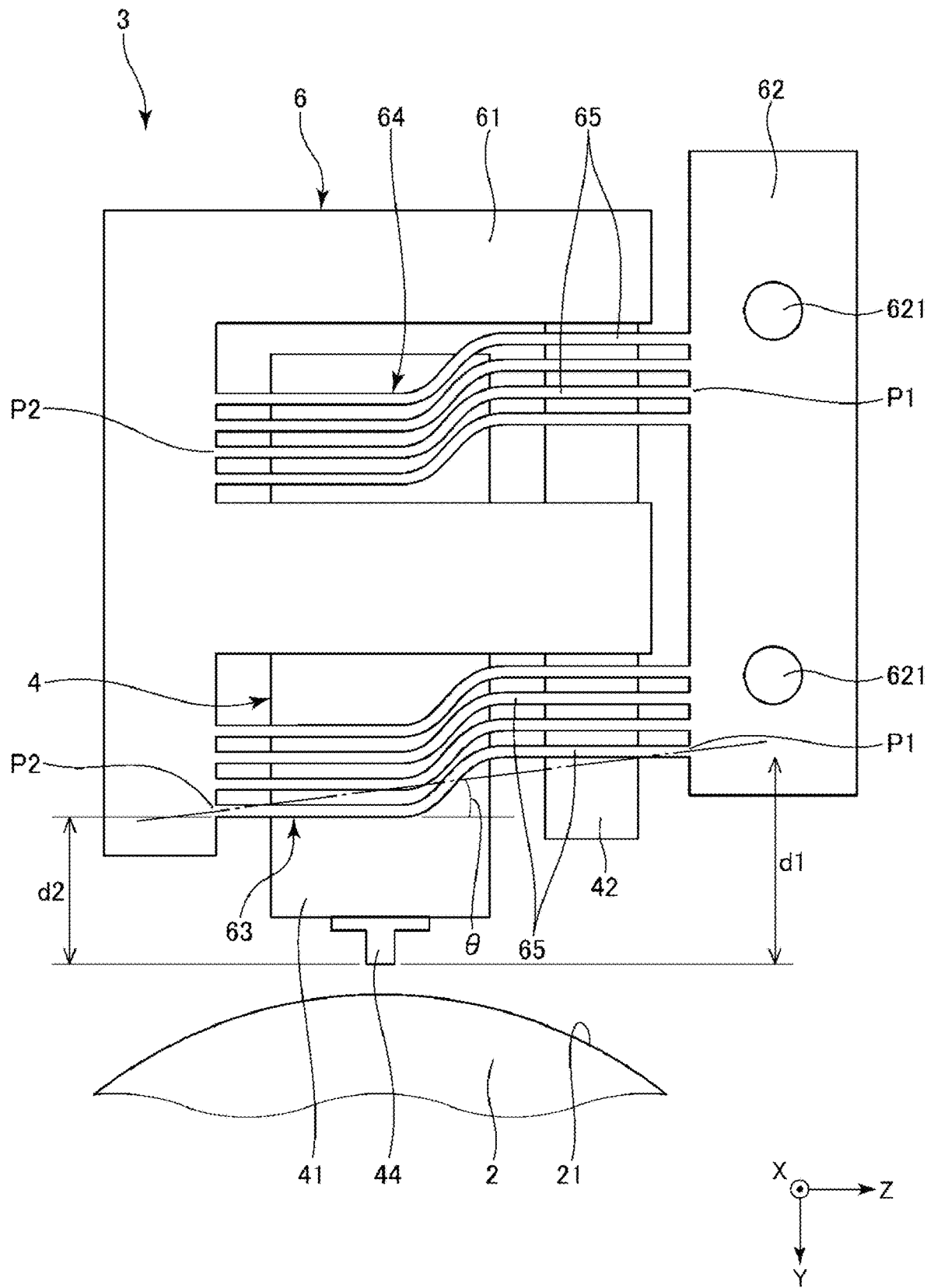
FIG. 14 is a plan view showing an urging member according to a second embodiment of the present disclosure.
Figure 15:
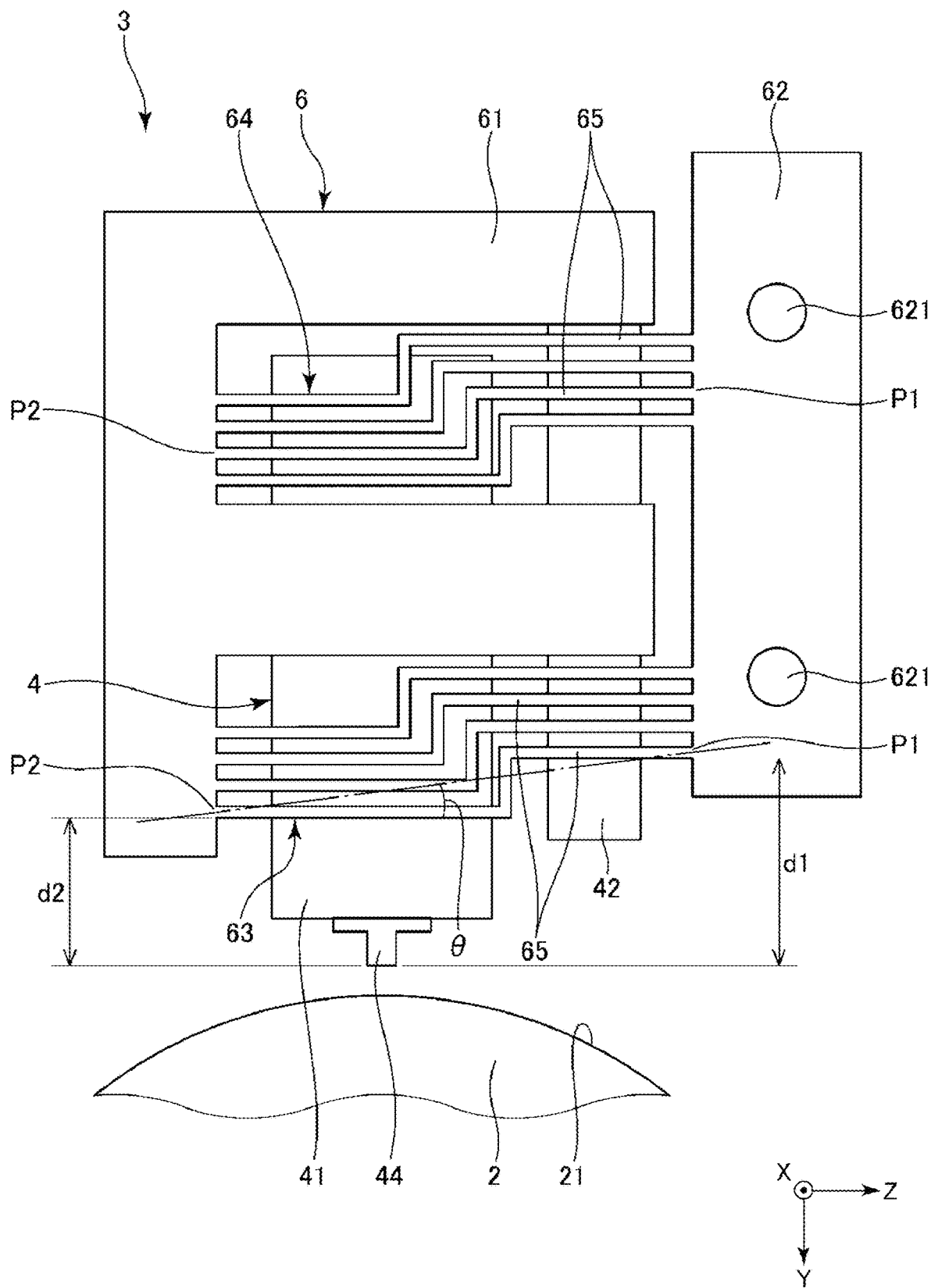
FIG. 15 is a plan view showing a modified example of the urging member shown in FIG. 14.

FIG. 14 is a plan view showing an urging member according to a second embodiment of the present disclosure. FIG. 15 is a plan view showing a modified example of the urging member shown in FIG. 14.

The embodiment is the same as above described first embodiment except that the configuration of the spring portion 65 is different. In the following description, the embodiment will be explained with a focus on the differences from the above described first embodiment and the explanation of the same items will be omitted. In FIGS. 14 and 15, the same configurations as those of the above described embodiment have the same signs. Note that the plurality of spring portions 65 have the same configuration as one another and, as below, for convenience of explanation, the single spring portion 65 will be representatively explained and the explanation of the other spring portions 65 will be omitted.

As shown in FIG. 14, the spring portion 65 of the embodiment has a configuration curved in an S-shape in the middle in the extension direction. Specifically, end parts of the spring portion 65 extend along the Z-axis directions and the end part at the holding portion 61 is located closer to the convex portion side, i.e., the plus side in the Y-axis direction than the end part at the base 62 side. Further, the center of the spring portion 65 is curved in an S shape so that the end parts located in the both side thereof are coupled. Thereby, d1>d2 may be set in the natural state by the simple configuration. Note that the shape of the spring portion 65 is not limited to that, but, for example, as shown in FIG. 15, may be bent in an S-shape in the middle in the extension direction. According to the configuration, the same effects as those of the embodiment may be obtained.

As described above, the spring portion 65 of the embodiment has the curved or bent part. Thereby, d1>d2 may be set in the natural state by the simple configuration.

According to the second embodiment, the same effects as those of the above described first embodiment may be exerted.

Third Embodiment

Figure 16:
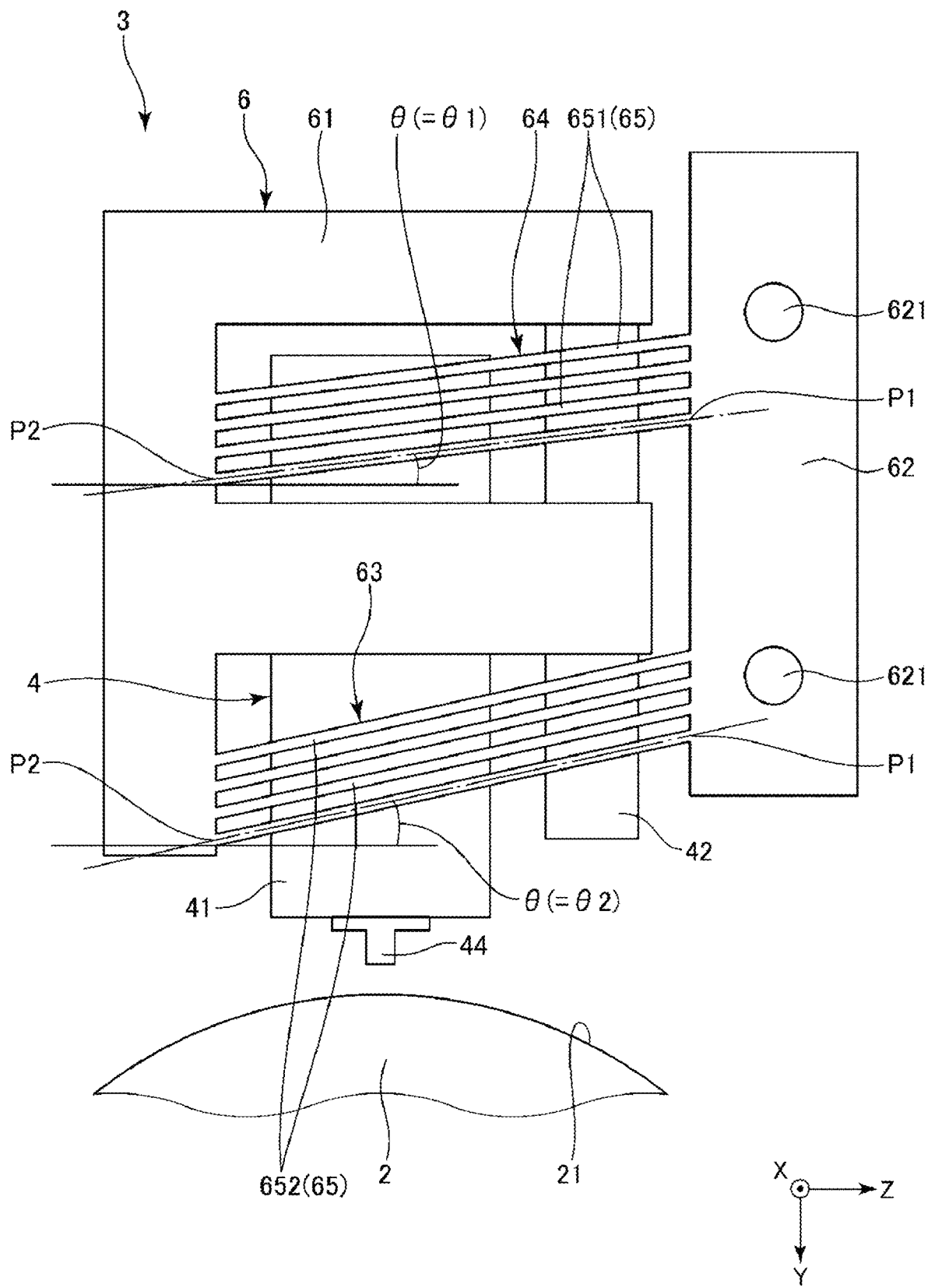
FIG. 16 is a plan view showing a natural state of an urging member according to a third embodiment of the present disclosure.

FIG. 16 is a plan view showing a natural state of an urging member according to a third embodiment of the present disclosure. FIG. 17 is a plan view showing an urging state of the urging member shown in FIG. 16.

The embodiment is the same as above described first embodiment except that the configuration of the spring portion 65 is different. In the following description, the embodiment will be explained with a focus on the differences from the above described first embodiment and the explanation of the same items will be omitted. In FIGS. 16 and 17, the same configurations as those of the above described embodiment have the same signs.

As shown in FIG. 16, the plurality of spring portions 65 include a plurality of first spring portions 651 at the tilt θ in the natural state set to θ1 and a plurality of second spring portions 652 at the tilt θ in the natural state set to θ2 larger than θ1. Particularly, in the embodiment, the plurality of spring portions 65 forming the spring group 63 include the second spring portions 652 and the plurality of spring portions 65 forming the spring group 64 include the first spring portions 651.

These first spring portions 651 and second spring portions 652 are inclined in the same direction relative to the Z-axis in the natural state, however, inclined in different directions relative to the Z-axis in the urging state as shown in FIG. 17. Accordingly, d1−d2<0 for the first spring portions 651 is satisfied and d1−d2>0 for the second spring portions 652 is satisfied. Thereby, the forces F4 generated in the respective first spring portions 651 and the forces F4 generated in the respective second spring portions 652 are in the opposite directions to each other and at least partially cancelled out. Accordingly, the forces F4 acting on the urging force may be reduced, the amount of movement or the movement velocity of the rotor 2 is hard to differ between the rotation of the rotor 2 in the direction of the arrow B1 and the rotation of the rotor 2 in the direction of the arrow B2, and the rotation of the rotor 2 may be accurately controlled.

Note that it is preferable to appropriately set the numbers of the placed first spring portions 651 and second spring portions 652, the tilts θ in the natural state, the values of |d1−d2| in the urging state, etc. so that the difference between the magnitude of the force F4 generated by all first spring portions 651 and the magnitude of the force F4 generated by all second spring portions 652 may be as small as possible, preferably zero. Thereby, the above described effects may be more remarkable.

As described above, the spring portion 65 of the embodiment has the first spring portions 651 for which d1−d2<0 in the urging state and the second spring portions 652 for which d1−d2>0 in the urging state. Thereby, the forces F4 generated in the first spring portions 651 and the forces F4 generated in the second spring portions 652 are in the opposite directions to each other and cancelled out each other. Accordingly, the forces F4 acting on the urging force may be reduced, the amount of movement or the movement velocity of the rotor 2 is hard to differ between the rotation of the rotor 2 in the direction of the arrow B1 and the rotation of the rotor 2 in the direction of the arrow B2, and the rotation of the rotor 2 may be accurately controlled.

According to the third embodiment, the same effects as those of the above described first embodiment may be exerted.

Note that the configuration of the spring portion 65 is not particularly limited. For example, in the embodiment, the plurality of spring portions 65 forming the spring group 63 include the second spring portions 652 and the plurality of spring portions 65 forming the spring group 64 include the first spring portions 651, however, the plurality of spring portions 65 forming the spring group 63 and the plurality of spring portions 65 forming the spring group 64 may respectively include the first spring portions 651 and the second spring portions 652. Or, for example, the first spring portions 651 may form all spring portions 65 included in one urging member 6 and the second spring portions 652 may form all spring portions 65 included in the other urging member 6.

Fourth Embodiment

Figure 18:
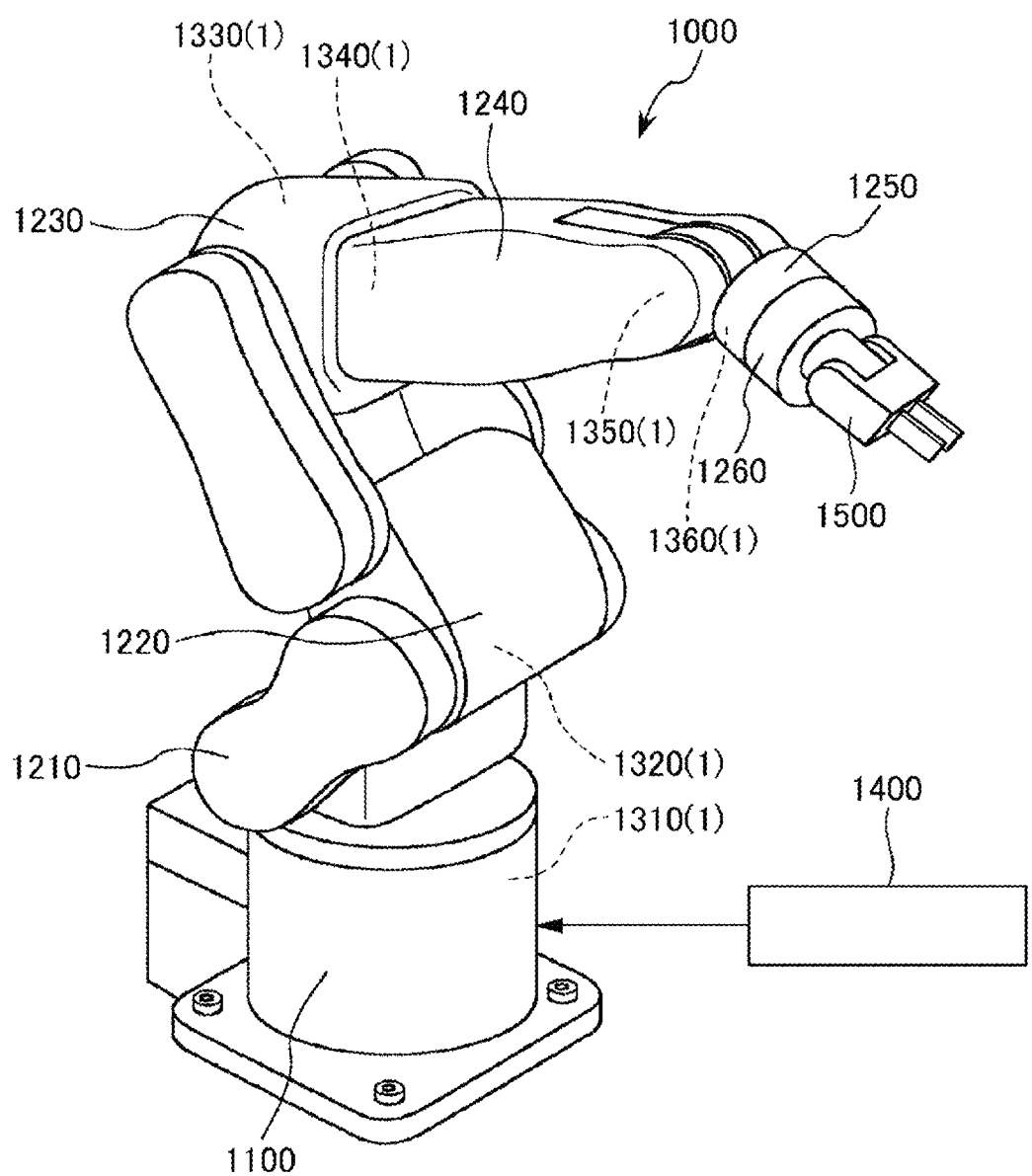
FIG. 18 is a perspective view showing a robot according to a fourth embodiment of the present disclosure.

FIG. 18 is a perspective view showing a robot according to a fourth embodiment of the present disclosure.

A robot 1000 shown in FIG. 18 may perform work of feeding, removing, transport, assembly, etc. of precision apparatuses and components forming the apparatuses. The robot 1000 is a six-axis robot and has a base 1100 fixed to a floor or ceiling, a first arm 1210 pivotably coupled to the base 1100, a second arm 1220 pivotably coupled to the first arm 1210, a third arm 1230 pivotably coupled to the second arm 1220, a fourth arm 1240 pivotably coupled to the third arm 1230, a fifth arm 1250 pivotably coupled to the fourth arm 1240, and a sixth arm 1260 pivotably coupled to the fifth arm 1250. A hand coupling portion is provided in the sixth arm 1260, and an end effector 1500 according to work to be executed by the robot 1000 is attached to the hand coupling portion.

Further, the robot 1000 has a first arm pivot mechanism 1310 placed in a joint part between the base 1100 and the first arm 1210 and pivoting the first arm 1210 relative to the base 1100, a second arm pivot mechanism 1320 placed in a joint part between the first arm 1210 and the second arm 1220 and pivoting the second arm 1220 relative to the first arm 1210, a third arm pivot mechanism 1330 placed in a joint part between the second arm 1220 and the third arm 1230 and pivoting the third arm 1230 relative to the second arm 1220, a fourth arm pivot mechanism 1340 placed in a joint part between the third arm 1230 and the fourth arm 1240 and pivoting the fourth arm 1240 relative to the third arm 1230, a fifth arm pivot mechanism 1350 placed in a joint part between the fourth arm 1240 and the fifth arm 1250 and pivoting the fifth arm 1250 relative to the fourth arm 1240, and a sixth arm pivot mechanism 1360 placed in a joint part between the fifth arm 1250 and the sixth arm 1260 and pivoting the sixth arm 1260 relative to the fifth arm 1250. Furthermore, the robot 1000 has a robot control unit 1400 that controls driving of these first to sixth arm pivot mechanisms 1310 to 1360.

The piezoelectric motors 1 are mounted as power sources in part or all of the first to sixth arm pivot mechanisms 1310 to 1360, and the corresponding arms 1210 to 1260 pivot by driving of the piezoelectric motors 1. Note that the piezoelectric drive device 3 is incorporated in the piezoelectric motor 1. Accordingly, the robot 1000 may enjoy the above described effects of the piezoelectric drive device 3 and may exert higher reliability.

As described above, the robot 1000 has the piezoelectric drive device 3. Accordingly, the robot may enjoy the above described effects of the piezoelectric drive device 3 and may exert higher reliability.

According to the fourth embodiment, the same effects as those of the above described first embodiment may be exerted.

As above, the piezoelectric drive device, the piezoelectric motor, and the robot according to the present disclosure are explained according to the illustrated embodiments. However, the present disclosure is not limited to those, but the configurations of the respective parts may be replaced by arbitrary configurations having the same functions. Further, another arbitrary configuration may be added to the present disclosure. Furthermore, the respective embodiments may be appropriately combined. In the above described embodiment, the configuration in which the piezoelectric drive device is applied to the robot is explained, however, the piezoelectric drive device may be applied to various other electronic devices requiring drive power than the robot, e.g. a printer, a projector, or the like.

What is claimed is:

1. A piezoelectric drive device comprising:
a vibrator having a vibrating portion including a piezoelectric element and performing longitudinal vibration and flexural vibration, and a convex portion placed in the vibrating portion and performing an elliptic motion; and
an urging member including a base, a holding portion holding the vibrator, and a spring portion coupled to the base at one end and coupled to the holding portion at another end and urging the convex portion toward a driven unit, wherein
$d1>d2$ in a natural state in which the vibrator is not urged by the urging member, where a separation distance between the one end and the convex portion along directions of the longitudinal vibration is $d1$ and a separation distance between the the other end and the convex portion along the directions of the longitudinal vibration is $d2$, and
$|d1-d2|$ in an urging state in which the vibrator is urged toward the driven unit by the urging member is smaller than $|d1-d2|$ in the natural state.

2. The piezoelectric drive device according to claim 1, wherein
$d1=d2$ in the urging state.

3. The piezoelectric drive device according to claim 1, wherein
the base, the holding portion, and the spring portion are integrally formed.

4. The piezoelectric drive device according to claim 1, wherein
the spring portion extends in directions inclined relative to directions orthogonal to the directions along the longitudinal vibration in a plan view.

5. The piezoelectric drive device according to claim 1, wherein
the spring portion has a curved or bent part.

6. The piezoelectric drive device according to claim 1, wherein
the spring portion has a first spring portion for which $d1-d2<0$ in the urging state and a second spring portion for which $d1-d2>0$ in the urging state.

7. The piezoelectric drive device according to claim 1, wherein
the urging member has an indicator unit indicating magnitude of $|d1-d2|$ based on a relative position relationship between the base and the holding portion.

8. The piezoelectric drive device according to claim 7, wherein
the indicator unit indicates $d1=d2$ when an end part of the holding portion opposite to the convex portion and an end part of the base opposite to the convex portion are aligned in directions orthogonal to the directions along the longitudinal vibration.

9. A piezoelectric motor comprising:
the piezoelectric drive device according to claim 1; and
a driven unit driven by vibration of the vibrator.

10. A robot comprising the piezoelectric drive device according to claim 1.

* * * * *